UNITED STATES PATENT OFFICE.

EDWIN CUNO KAYSER, OF BEAU SEJOUR, ST. BRELADE'S BAY, ISLE OF JERSEY, ASSIGNOR, BY MESNE ASSIGNMENTS, TO THE HYDROGENATION COMPANY, OF CINCINNATI, OHIO, A CORPORATION OF OHIO.

CATALYZER AND METHOD OF PREPARING THE SAME.

1,236,446.     Specification of Letters Patent.     Patented Aug. 14, 1917.

No Drawing.     Application filed June 12, 1914. Serial No. 844,794.

*To all whom it may concern:*

Be it known that I, EDWIN CUNO KAYSER, a subject of the King of Great Britain, residing at Beau Sejour, St. Brelade's Bay, Isle of Jersey, have invented a new and useful Catalyzer and Methods of Preparing the Same, of which the following is a specification.

It is well known that unsaturated fatty bodies (such as the natural vegetable and animal oils and fats) can be made to absorb hydrogen, and can thus be solidified or hardened, by being brought into intimate contact with the gas in presence of certain inorganic or organic nickel-compounds, such as the carbonate, the hydrate, the oxid, the formate or acetate.

These latter bodies however, before they become capable of transmitting hydrogen, have in their turn, and under the action of the gas, to suffer preliminary fundamental changes, of hitherto undefined nature. Such changes do not take place at a temperature materially below 250 or even 275 degrees centigrade, such as is not readily imparted and is detrimental to fatty bodies.

Once formed, the catalyzers will transmit hydrogen to fatty bodies at a more moderate temperature.

Excessive heating of all but a limited quantity of unstable material may accordingly be avoided, in the practice of fat-hardening, by preparing in advance and in the manner described, a concentrated fatty catalyzer-paste or catalyzer-cake, which is thereafter used at a lower temperature for the conversion of unsaturated fatty bodies in presence of hydrogen: or the preliminary treatment of the catalyzer may be carried out at relatively high temperatures in another, and preferably indifferent, fluid medium, such as paraffin wax, the resulting catalyzer being thereafter isolated and applied to its ultimate purpose. These methods however are not without inconvenience and drawbacks.

Now, I have observed that the said nickel compounds, and some others not hitherto available, can readily be converted into catalyzers of superior activity and longevity, and this at a temperature not exceeding 180 degrees centigrade, when the preliminary treatment is carried out in presence of a small quantity of certain finely divided metals, and that fatty bodies can at a moderate temperature be conveniently "hardened", that is saturated with hydrogen to any desired degree, if they are submitted to the action of hydrogen in the simultaneous presence of the usual amount of nickel compound and of a comparatively small amount of finely divided auxiliary catalytic metal, such as would by itself exercise upon the fat but very slight action, or no action whatever.

Thus, if 250 grams of cotton seed oil be indefinitely agitated with hydrogen at 180 degrees centigrade in presence of 6 grams of commercial nickel-carbonate, the mixture does not change color, and no "hardening" of the oil takes place. If the oil be similarly treated with gas in the sole presence of 0.5 (½) gram of so called "atomic" copper, prepared in the known manner by the action of zinc dust on copper sulfate solution, a like negative result is registered. If however the said quantities of nickel carbonate and copper metal be simultaneously present, the charge rapidly darkens and becomes progressively "hardened", showing after two hours a melting point of 46 degrees centigrade, after three hours a melting point of 52° C., and after four hours a melting point of 56° C. When finally freed from suspended catalyzer by filtration or other mechanical means, the fat will set to a white, tasteless and odorless, brittle solid. The recovered catalyzer can repeatedly be used in the same manner; its activity will at first be found to increase and then to slowly decline.

Similar, but somewhat inferior, results are produced with nickel hydrate in place of carbonate, while the oxids and organic nickel salts do not readily coöperate, or entirely fail, with copper.

Such organic compounds, as the formate, on the contrary are, like the hydrate, the carbonate, the oxid or per-oxid of nickel, rapidly transformed and activated by a small quantity of catalytic metallic nickel, produced in the known manner by dry reduction of the oxid, hydrate or carbonate in a current of hydrogen. Even the oxalate, otherwise quite stable at 275° C., is thus readily transformed into an efficient catalyzer.

For example, 250 grams of cotton seed oil, agitated with hydrogen at 180° C. in presence of 0.5 gr. of active nickel powder, are in three hours "hardened" to a melting point of 37° C.; in the simultaneous presence of 7 grams of nickel hydrate the charge rapidly turns gray and, when filtered after three hours running, reveals a white fat, melting at 54° C.

In the same manner, coöperation of 0.5 gr. nickel powder with 12.5 gr. nickel oxalate yields in three hours a white fat, melting at 54° C.

The reactions described, separately and jointly, may frequently be facilitated and accelerated by using, instead of the pure nickel compound and the pure auxiliary metal, the like bodies, diffused among, or deposited upon, kieselguhr or a similar indifferent support.

The chemical nature and the appearance of the nickel catalyzer or catalyzers, produced by the present process, varies with the auxiliary metal employed. Nickel yields a gray, emphatically non-metallic catalyzer, while copper produces a black body, developing with hydrochloric acid far less hydrogen, than what would correspond with the hypothetical sub-oxid $Ni_2O$.

I claim:

1. The method of preparing a catalytic body, which consists in subjecting a substantially non-catalytic nickel compound to the action of hydrogen at a temperature sufficing to effect reduction, in presence of an auxiliary catalytic metal.

2. The method of preparing a catalytic body, which consists in subjecting a substantially non-catalytic nickel compound to the action of hydrogen at a temperature of about 180° C., and in presence of an auxiliary catalytic metal.

3. The method of preparing a catalytic body, which consists in subjecting a substantially non-catalytic nickel compound to the action of hydrogen at a temperature sufficing to effect reduction, in presence of a relatively small proportion of an auxiliary catalytic metal.

4. The method of preparing a catalytic body, which consists in subjecting a substantially non-catalytic nickel compound to the action of hydrogen at a temperature sufficing to effect reduction, in presence of a relatively small proportion of copper, said nickel compound being one whose reduction by hydrogen is facilitated by the presence of copper as a catalyzer.

5. The method of hydrogenizing unsaturated fatty bodies with simultaneous preparation of a catalyzer, which consists in subjecting such bodies to the action of hydrogen in presence of a substantially non-catalytic compound of nickel and an auxiliary catalytic metal, at a temperature sufficing to reduce said compound.

6. The method of hydrogenizing unsaturated fatty bodies with simultaneous preparation of a catalyzer, which consists in subjecting such bodies at a temperature of about 180° C., to the action of hydrogen in presence of a substantially non-catalytic compound of nickel and an auxiliary catalytic metal.

7. The method of hydrogenizing unsaturated fatty bodies with simultaneous preparation of a catalyzer, which consists in subjecting such bodies to the action of hydrogen at a temperature sufficing to effect reduction, in presence of a substantially non-catalytic compound of nickel and a relatively small proportion of an auxiliary catalytic metal.

8. The method of hydrogenizing unsaturated fatty bodies with simultaneous preparation of a catalyzer, which consists in subjecting such bodies to the action of hydrogen at a temperature sufficing to effect reduction, in presence of a substantially non-catalytic compound of nickel and a relatively small proportion of copper, said nickel compound being one whose reduction by hydrogen is facilitated by the presence of copper as a catalyzer.

9. A catalyzer comprising a catalytic nickel compound intimately associated with a relatively small proportion of an auxiliary catalytic metal.

10. A catalyzer comprising a catalytic nickel compound intimately associated with a relatively small proportion of copper.

EDWIN CUNO KAYSER.

Witnesses:
A. EBREANT,
CLEMENT J. MALLET.